_United States Patent Office_

3,330,819
Patented July 11, 1967

3,330,819
HYDROXY NAPHTHOIC ACID MONOAZO DYESTUFF
Arthur S. Neave, Jr., Sycamore Township, Hamilton County, Ohio, assignor to Sterling Drug Inc., New York, N.Y., a corporation of Delaware
No Drawing. Filed Jan. 11, 1962, Ser. No. 165,654
1 Claim. (Cl. 260—203)

This invention relates to monoazo pigment dyestuffs. More particularly, the present invention relates to a novel water-insoluble red dyestuff having the structural formula

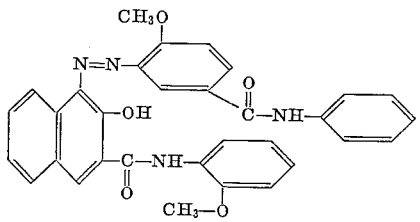

and having valuable properties as a pigment, particularly for textile printing.

Azo pigments obtained by coupling diazotized aromatic amines with arylides of 3-hydroxy-2-naphthoic acid and its analogs constitute a large and well-known class of compounds. During the course of many years of research on this class of pigments by a large number of investigators, only a small percentage of the numerous individual species which have been prepared have proved to possess sufficiently satisfactory properties to make them suitable for practical use in the coating art. At the same time, it has also been established that there is a tremendous variation among the combinations of properties, such as hue, brilliance, tinting value or strength, resistance to fading, wash fastness, and the like, so that despite the considerable previous work in this area persistent efforts to discover new and better pigments of this type have continued virtually unabated.

It is a particular object of the instant invention to provide a brilliant red, water-insoluble pigment having low solubility in halohydrocarbon solvents of the type used in the dry-cleaning of fabrics, for instance perchloroethylene. Other objects and advantages of the invention will be apparent from the disclosure.

The new pigment of this invention is the water-insoluble product obtained by coupling diazotized 3-amino-4-methoxybenzanilide with 3-hydroxy-2-naphth-o-anisidide. Since the reaction temperature has some effect on the shade of the resulting water-insoluble pigment, it is ordinarily desirable to maintain adequate control of the temperature of the reaction mixture in some predetermined manner. It is satisfactory for most applications of the pigment product to stir the reactants together at a temperature in the approximate range 15–30° C. to effect only an incomplete coupling reaction, and then heat the mixture at a higher temperature, for instance in the approximate range 75–100° C., preferably at 95° C., to complete the coupling reaction and develop the pigment. The reaction is started in an alkaline aqueous medium but the pH of the reaction mixture drops during the process to a final value of about 5.0.

The manner in which my new pigment is obtained is illustrated by the following example without, however, being limited thereto. In this example the term "parts" is in each instance used to indicate parts by weight.

_Example_

To a slurry of 24.2 parts of 3-amino-4-methoxy-benzanilide in 150 parts of water there was added, at room temperature and with stirring, 43.5 parts of 20° Bé. hydrochloric acid. After all of the solid had dissolved, the temperature of the solution thus obtained was adjusted to 0° C. by addition of ice, and the 3-amino-4-methoxybenzanilide was then diazotized by adding 7.0 parts of sodium nitrite in the form of a 20 percent aqueous solution. The reaction mixture was stirred at 0° C. for one hour. The excess nitrite was then removed by addition of an aqueous solution of sulfamic acid until nitrite ion could no longer be detected by testing with starch-iodide paper, and the mixture was made slightly alkaline to Congo red test paper by addition of 20.0 parts of sodium acetate.

In a separate container, a slurry of 31.0 parts of 3-hydroxy-2-naphth-o-anisidide in a mixture of 40.0 parts of methyl alcohol, 300.0 parts of water, and 8.5 parts of sodium hydroxide was heated at approximately 70° C. until all of the solid had dissolved. This solution was added to 700.0 parts of water at 25° C. having dissolved therein a small amount of a wetting agent (0.45 part of an 80 percent aqueous solution of the sodium salt of dihexyl sulfosuccinate). To the solution obtained in this manner there was added rapidly, during a period of about six minutes, the reaction mixture containing the cold (0° C.) preparation of diazotized 3-amino-4-methoxybenzanilide obtained as described above. The resulting reaction mixture was stirred for one hour at 18° C., after which it was heated and stirred at 95° C. for one-half hour, and was then diluted with sufficient cool water to lower the temperature of the mixture to about 60° C. The mixture was then filtered, and the solid thus collected was washed with water until free of water-soluble chloride ion, and dried. There was thus obtained 62 parts of bright red solid. It turned brown at 280° C. and melted at 305–310° C. with decomposition when heated at the rate of ten degrees per minute. This product was the monoazo dyestuff having the structural formula

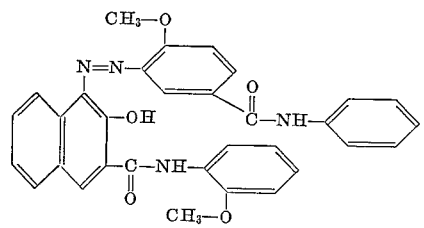

It was insoluble in water and dilute aqueous sodium hydroxide solution, had very low solubility in perchloroethylene, and was slightly soluble in boiling N,N-dimethylformamide.

The novel pigment of this invention obtained as described above was evaluated in the following manner as a pigment for use in textile printing.

An aqueous dispersion of the new pigment was prepared by dispersing an undried press cake of the pigment in water containing the sodium salt of a formaldehyde- naphthalene-sulfonic acid condensation product in the amount of 3–7 percent of the calculated weight of dry pigment in the press cake. To produce a concentrated color base, 100 parts of the water dispersion thus prepared and containing 20–25 percent by weight of the new pigment was emulsified with 100 parts of an emulsifiable vehicle composed of: 4 parts of a 50 percent solution of unmodified butylated melamine-formaldehyde resin (Resimine 875—Monsanto) in a mixture of equal parts of butanol and xylene; 13 parts of dipentene; 0.6 part of ethyl cellulose N-22; and 2.4 parts of isooctyl alcohol. One part of the water-in-oil emulsion thus obtained was mixed, using a high speed mixer, with 10 parts of a textile printing clear (water-in-oil type) to produce a 1 to 10 cut printing paste. By mixing one part of the 1 to 10 cut printing paste with 10 parts of the printing clear, a 1 to 100 cut printing paste was produced. The printing pastes were printed on cloth, using a standard laboratory textile printing machine. The printed cloths were then examined and tested using standard procedures, with respect to the following: shade, resistance to fading, and resistance to loss of color value on dry cleaning with perchloroethylene (using AATCC colorfastness to dry cleaning tentative test method 85–1960), three requirements which were considered as essential to be met by a satisfactory product; brilliance; tinting value (strength); wash-fast properties (resistance to bleeding, or loss of color); resistance to strong alkali; resistance to chlorine; and resistance to discharge effect of hydrosulfite. The results of this evaluation were as follows. The prints obtained were red in the medium range in shade, being neither too blue nor too yellow in shade and well within the range of shades satisfactory to textile printers, had very good resistance to fading, and had excellent resistance to dry-cleaning with perchloroethylene, thus satisfying all three of the requirements considered as essential; were very brilliant and strong; had excellent wash-fastness; had excellent resistance to strong alkali; had good resistance to chlorine; and had excellent resistance to color discharge by hydrosulfite.

The foregoing results established that the novel monoazo dyestuff of this invention has highly valuable properties adapting it particularly to use as a pigment in textile printing.

I claim:
The water-insoluble monoazo dyestuff having the structural formula:

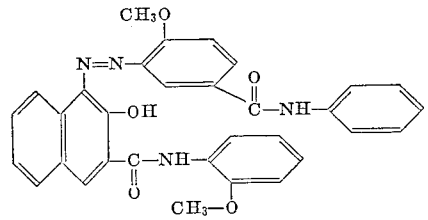

References Cited
UNITED STATES PATENTS
1,522,089   1/1925   Wagner et al. _____ 260—203
1,549,822   8/1925   Wagner _____ 260—203
2,915,518   12/1959   Fischer _____ 260—203

FOREIGN PATENTS
768,978   5/1934   France.
602,064   8/1934   Germany.
889,739   9/1953   Germany.

CHARLES B. PARKER, *Primary Examiner.*

N. S. MILESTONE, *Assistant Examiner.*